2,956,042

FILM FORMING COMPOSITIONS OF POLYETHYLENE AND POLYPROPYLENE, FILM THEREOF, AND METHOD OF MAKING SAME

William F. Underwood, Oak Park, and Edward D. Fuller, Chicago, Ill., assignor to Union Carbide Corporation, a corporation of New York No Drawing. Filed Dec. 12, 1957, Ser. No. 702,234

10 Claims. (Cl. 260—45.5)

This invention relates to polyethylene film compositions. And, more particularly it relates to polyethylene film compositions exhibiting improved clarity.

Polyethylene in the form of seamless tubing or sheeting has found extensive use as a packaging, wrapping and covering material. Because it is inert to most chemicals, possesses great mechanical strength, resists moisture vapor penetration and allows the material it protects to be seen, polyethylene film is admirably suited for these applications. The films currently available although termed clear are characterized by a cloudiness, milkiness or haze.

We have now found that by intimately incorporating and dispersing into a normally solid film-forming ethylene polymer, a minor proportion of polypropylene and thereafter melt extruding said composition into self-sustaining films, the film obtained is unexpectedly clearer and more transparent than polyethylene film without polypropylene incorporated therein.

In order to effect a uniform improvement in film clarity, it is preferred that a substantially homogeneous mixture of the polypropylene and polyethylene be achieved. Intimate incorporation and dispersion can be obtained by the use of a differential two-roll mill, a Banbury mixer or similar apparatus. In practice, the polyethylene is introduced into the mill or mixer, the desired amount of polypropylene is added and the two are mechanically worked until a substantially homogeneous mixture is obtained. Best results are obtained by carrying out the incorporation and dispersion of the polypropylene and polyethylene at a temperature equal to or above the melting point of the polyethylene.

"Film-forming" as used herein denotes a property of polyethylene whereby it can be formed into a self-sustaining film or employed as a surface coating. Any polyethylene which possesses this film-forming property is suitable for use in the composition of our invention. For example, polyethylene with a melt index of 1.9, and a density of 0.918 has given satisfactory results.

Polypropylene, suitable for use in this invention is total polymer made by the process disclosed in Australian patent application No. 6365/55 to Phillips Petroleum Company.

As described therein, the total polymer comprises a tacky portion consisting of low molecular weight polymer, having a weight averaged molecular weight of from 500 to 5000, boiling above 900° F. and soluble at room temperature in n-pentane and methyl isobutyl ketone; a solid portion consisting of high molecular weight polymer which also boils above 900° F. but which is insoluble in both n-pentane and methyl isobutyl ketone; and 10 to 20% of liquid polymeric material boiling at approximately 400 to 900° F.

The solid portion of the total polymer melts within the range of 240 to 300° F., has a density between about 0.90 and 0.95, and an intrinsic viscosity between about 0.2 and 1.0. The weight averaged molecular weight of the solid polymers ranges from between about 5000 and 20,000. These values were calculated according to the equation $$M = \frac{(4.03)(10^3)(N_i)(14)}{2.303}$$

wherein M is the weight average molecular weight and $N_i$ is the intrinsic viscosity as determined for a solution of 0.2 gram of the polymer in 50 cc. of tetralin at 130° C. This type of molecular weight determination is described by Dienis and Klemm, J. Applied Phys., 17, 458 (June 1946).

The proportion of polypropylene in polyethylene is critical. Improved clarity in a film can be obtained without substantially changing other physical characteristics by intimately incorporating and dispersing between 0.1 to 2.0 parts by weight of polypropylene in 100 parts by weight of polyethylene. Amounts of polypropylene added in excess of 2.0 parts, although it improves the clarity of the film has the undesirable effect of imparting to the film a tacky and greasy feel. If an amount of polypropylene less than 0.1 part by weight of polypropylene in 100 parts by weight of polyethylene is used with the method of this invention there is no appreciable improvement in clarity of the film produced therefrom.

The preferred limits of our invention are 0.5 to 1.5 parts by weight of polypropylene per 100 parts by weight of polyethylene.

Any of the normally employed additives, such as fillers, stabilizers, plasticizers, colorants and the like can be added to the composition of this invention provided they are not present in amounts which will offset the improvement in clarity rendered by the addition of the polypropylene.

The polyethylene-polypropylene mixture after removal from the mill or mixer can be melt extruded by any of the methods known to the art.

This invention is particularly suitable for the production of coatings or non-supported films of polyethylene with a thickness of between less than 0.0005 and about 0.005 in. and is especially useful for production of films for packaging applications where the advantage of transparency is desired in addition to the characteristic properties of polyethylene film such as in food wrapping, sales packages and see-through containers.

In a preferred embodiment of our invention polyethylene with a molecular weight above 18,000 is placed on a differential two-roll mill and heated while it is being worked at a temperature equal to or greater than the melting point of the polyethylene i.e., about 115° C.

As soon as the polyethylene begins to soften, the gradual addition of .5 to 1.5 parts by weight of polypropylene per 100 parts by weight of polyethylene is begun. The operation of the heated mill is not interrupted during the addition and is continued after the addition is completed and a substantially homogeneous mixture is obtained. This mixture is then removed from the mill, cooled and cut into particles of appropriate size for extrusion.

The preferred method of extrusion is the blown tube method disclosed in U.S. Patent 2,461,975 to Fuller and 2,461,976 to Schenk. This method comprises, in general, dry extruding molten thermoplastic material through an annular die, in the form of a seamless tubing, and as the tubing is being drawn from the die, it is inflated to the desired diameter by means of an air bubble contained therein and a cooling medium applied to the periphery of the tubing. The tubing is drawn continuously from the die and cooled until set whereupon it is flattened and wound on reels. Sheeting can be made from the tubing by cutting one or both of the longitudinal edges.

Film produced from a polyethylene-polypropylene composition prepared without intimate incorporation and dispersion as achieved by heating the polyethylene to at least its melting point, as hereinbefore described does not exhibit the uniformly improved clarity which is characteristic of the composition which has been so processed.

The following examples are illustrative.

EXAMPLE I 100 parts of polyethylene with a melt index of 1.9 and a density of 0.918 were placed on a differential two-roll mill with a roll temperature of 115° C. The ratio of roll speeds was approximately 1.2–1.4 to 1, the slower roll turning at 20 revolutions per minute. The polyethylene was heated to softening and 0.5 parts by weight of the polypropylene hereinbefore described were added. The polyethylene and polypropylene were milled on the heated rolls for approximately five minutes until a homogeneous mixture was obtained. The composition was removed from the mill, cooled and cut into particles of a size suitable for melt extrusion. The film was formed by the blown tube method of extrusion set forth in U.S. P. 2,461,976 and the clarity determined by ASTM method D–1003–52. The results of the test are given in terms of total surface haze. The film prepared from the composition containing 0.5 part by weight polypropylene per 100 parts by weight polyethylene had a haze value of 2.1 units.

An additional sample was prepared for control purposes. The above procedure was repeated except that the addition of polypropylene was omitted. The total surface haze of the film produced in this example was 6.7 units.

EXAMPLE II

Example I was repeated except that 1.0 parts by weight of polypropylene added per 100 parts by weight of polyethylene. The total surface haze of the film produced from this composition was found to be 2.6 units. The control sample again had a haze value of 6.7 units.

*Table 1*

|  | Composition, Parts by Weight | | Haze Value (ASTM D-1003-52) |
|---|---|---|---|
|  | Polyethylene | Polypropylene |  |
| Control | 100 | None | 6.7 |
| Example I | 100 | 0.5 | 2.1 |
| Example II | 100 | 1.0 | 2.6 |

Since it is obvious that various changes and modifications may be made in the above description without departing from the nature or spirit thereof, this invention is not restricted thereto except as set forth in the appended claims.

We claim:

1. A method for the production of polyethylene film which includes the steps of intimately incorporating and dispersing in 100 parts by weight of a normally solid film-forming ethylene polymer 0.1 to 2.0 parts by weight of polypropylene, and thereafter melt extruding the composition.

2. A method for the production of polyethylene film which includes the steps of intimately incorporating and dispersing in 100 parts by weight of a normally solid film-forming ethylene polymer 0.5 to 1.5 parts by weight of polypropylene, and thereafter melt extruding the composition.

3. The method in claim 1 wherein the polypropylene is intimately incorporated and dispersed in the polyethylene at a temperature at least equal to the melting point of the polyethylene.

4. The method in claim 2 wherein the polypropylene is intimately incorporated and dispersed in the polyethylene at a temperature at least equal to the melting point of the polyethylene.

5. A film-forming composition comprising a homogeneous mixture of 100 parts by weight of a normally solid film-forming ethylene polymer and 0.1 to 2.0 parts by weight of polypropylene.

6. A film-forming composition comprising a homogeneous mixture of 100 parts by weight of a normally solid ethylene polymer and 0.5 to 1.5 parts by weight of polypropylene.

7. A film-forming composition comprising a homogeneous mixture of 100 parts by weight of a normally solid ethylene polymer having a molecular weight greater than 18,000 and 0.5 to 1.5 parts by weight of polypropylene.

8. A transparent film comprising essentially a homogeneous mixture of 100 parts by weight of a normally solid, film-forming ethylene polymer and 0.1 to 2.0 parts by weight of polypropylene.

9. A transparent film comprising essentially a homogeneous mixture of 100 parts by weight of a normally solid, film-forming ethylene polymer and 0.5 to 1.5 parts by weight of polypropylene.

10. A transparent film comprising essentially a homogeneous mixture of 100 parts by weight of a normally solid, film-forming ethylene polymer having a molecular weight greater than 18,000 and 0.5 to 1.5 parts by weight of polypropylene.

References Cited in the file of this patent

UNITED STATES PATENTS 2,692,259    Peters    Oct. 19, 1954
2,791,576    Field    May 7, 1957

OTHER REFERENCES

Raff: "Polyethylene," volume XI, (1956), page 71 relied upon.